UNITED STATES PATENT OFFICE.

VICTOR G. BLOEDE, OF CATONSVILLE, MARYLAND.

PROCESS OF MANUFACTURING VEGETABLE GLUE.

1,357,310.  Specification of Letters Patent.  Patented Nov. 2, 1920.

No Drawing.  Application filed November 27, 1917. Serial No. 204,200.

*To all whom it may concern:*

Be it known that I, VICTOR G. BLOEDE, a citizen of the United States, residing at Catonsville, in the county of Baltimore and State of Maryland, have invented new and useful Improvements in the Processes of Manufacturing Vegetable Glue, of which the following is a specification.

This invention relates to an improved adhesive product for use in the wood-working arts and other branches of industry requiring a very powerful adhesive, and which products are known in technology under the general classification of vegetable glues in contradistinction to animal glues which were formerly used exclusively in the lines of industry referred to, and for which these vegetable products have proved a satisfactory substitute.

Heretofore these so-called vegetable glues have been produced by the action of the caustic alkali upon starch or other amylaceous matter and form the subject of a number of patents both in this country and Europe.

One of the objections to these products is their highly caustic properties, which cause the deep and permanent discoloration or staining of many of the woods to which they are applied, or in paper or pasteboard work the discoloration or discharge of the organic colors used in their tinting.

Another objection to these alkaline vegetable glues is the fact that they are comparatively readily soluble in water and do not possess the maximum adhesive properties that the starch bases are capable of developing under the forms of chemical treatment, which are the subject of this specification.

My invention is based upon the fact that there are certain basic chemical compounds, which when brought into contact with starch or amylaceous matter in a suitable condition of solution or suspension have the property of coagulating or curdling the starch by entering into a chemical combination with same. This coagulated starch, prepared under proper conditions, possesses the property while in the wet state of remaining in suspension or semi-solution in such mechanical condition of cohesion and smoothness as to make it possible to apply same to the surface to be cemented, although upon drying these starch coagulates become practically insoluble in water.

The products I produce in their general mechanical character somewhat resemble the various forms of casein that can be produced in the treatment of milk.

If an acid is added to hot milk, the casein curds out in stringy tough masses or clots, which show resistance to all mechanical attempts to bring the various particles constituting this curd into a homogeneous, smooth and finely divided suspension, or pseudo-solution. If, however, milk is treated under proper conditions of temperature with rennet or weak acid, the curd or casein instead of separating into tough, irregular masses, or clots, becomes subdivided and suspended in a state of extremely fine division to such a degree as to form a colloid or pseudo-solution as shown for instance in the well-known article of diet and domestic use called junket.

A very similar condition can be brought about in the coagulation of starch, which is the subject of my invention; the object of my process being to curd or coagulate the particles of starch in such manner that a perfectly smooth, homogeneous, and highly cohesive as well as adhesive compound is the result.

A product of this kind can be obtained from starch as in the production of casein just cited by the use of a proper starch coagulant and the observance of certain mechanical conditions in the handling or processing of the materials.

To make the character of my invention and product still more clear I will give the following illustration: If a paste is made by boiling ordinary starch in dry form with four or five times its weight of water, as for instance is customary in laundry work, a clear paste or jelly is produced. If to this clear jelly is now added a solution of the per-chlorid or per-nitrate of iron, the iron-salt diffuses itself throughout the mass without indicating any curdling or coagulating action, but if to this combination of starch and a per-salt of iron a sufficient amount of ammonium hydrate, or other alkali is added to neutralize the acid of combination of the iron-salt, the starch paste loses its smooth, homogeneous condition and becomes coagulated, that is, clotted or curdled similar to the curdling seen in milk upon the addition of acid. The compound formed separates in clotted masses of grainy nonhomogeneous character, in which form the starch coagulate is not readily applicable to the purposes of a vegetable glue, but it is this coagulum of starch obtained by the action of some suitable metallic or alkaline base, in a smooth and perfectly colloidal form, which is the basis of my new product.

In practice I have found other salts than those of iron to be more satisfactory and suitable, the iron-salts mentioned being simply given as an illustration of my invention, because the per-salts of iron possess the starch coagulating property in a more marked form than some other equivalent substances and the coagulation resulting is more apparent in a colored compound than in a colorless one.

There are numerous colorless coagulants of starch, and these are the substances I prefer to use in the production of my vegetable glue. Among the many substances I have found suitable to my requirements in producing this peculiar colloidal form of starch I may name the compounds of lime, barium, strontium, aluminum, magnesium, etc.

Among the most active of these, as well as most economical in point of cost as well as desirable on account of absence of all color, may be named the compounds of lime, barium and zinc, although I do not of course confine myself to any one of these compounds.

In order to further illustrate and enlarge on the principle underlying my invention I may state that if milk of hydrate of lime, or hydrate of barium be added to a clear starch paste, produced by boiling starch in water, the curdling of the starch is at once affected, but while this direct method of producing the coagulate desired might under special conditions be made to produce a composition which could be used as a vegetable glue, this direct method is not the best or most practicable manner of producing the compound desired for the reason that, as in the case of the iron-salt previously mentioned, the coagulated mass of starch produced in this way is not of a sufficiently even, or finely divided character, that is, it is not homogeneous, but results in a stiff, clotty, mass, which would make it difficult of application under the method of using adhesives now generally employed in the wood-working and paper-box-making arts.

I have found, as the result of a great many trials, that I can overcome this trouble and produce a smooth, cohesive and perfectly homogeneous, vegetable glue of extraordinary adhesive properties by first acting upon the starch with a soluble salt which will blend with the starch solution without curdling it, but the base of which, when liberated within the body of the starch composition under certain definite mechanical conditions, is capable of effecting the coagulation of the starch in perfectly smooth colloidal form, this coagulating base being liberated by the addition of a substance capable of combining with and abstracting the acid from the salt employed.

As previously stated, there are a number of neutral salts, such as chlorid of calcium, barium, etc., which can be boiled with starch, not only without coagulating the starch, but which seem to increase its solubility and hence the smoothness and clearness of the paste resulting, yet the base of which when liberated act as coagulants, for which reason I do not confine myself to the compounds named and use the words "equivalent salts," by which I mean any metallic salt, or salt of the alkalis, the base of which possesses the property of coagulating amylaceous matter.

A starch paste having been made containing a salt of this character I add to such paste a sufficient quantity of a stronger base than that of the coagulating salt employed, that is, a stronger alkali, preferably in the caustic state, in sufficient quantity to liberate, or partly liberate, the coagulating base by the double decomposition resulting.

By this method of procedure the coagulating base is liberated, so to speak, in a nascent condition, and in the minutest state of subdivision, resulting in a perfectly smooth and uniform starch coagulum, or colloid, of highly adhesive properties and capable, when of proper concentration, of perfectly cementing two surfaces of wood or other material, so that they can not be again separated without splitting the fibers of the material cemented.

I believe this compound described to be an entirely new product of high industrial value, involving a principle not heretofore employed in the manufacture of vegetable glues and based upon the formation of a definite starch compound practically insoluble in water when dry, but held in pseudo-solution, suspension or colloidal form through the extreme subdivision of the starch compound produced by this treatment.

I have found a great variation in the degree of insolubility of this starch compound according to the character of the coagulating base. Barium in particular yields a product under the treatment named which is entirely insoluble, or practically so, while the coagulum produced by lime and other bases present different degrees of insolubility, the latter property also being largely dependent upon the quantity of the base employed, that is to say, the relative quantity of base and starch.

In the practical production of my vegetable glue a number of special points have to be observed to secure the proper combination, a neglect of which results in failure by the production of the untractable clotted masses previously described, instead of the smooth and perfectly homogeneous composition desired.

Having now described the general character and purpose of my invention, and the principle, as I understand it, underlying the production of my vegetable glue, I will proceed to describe in detail the method I employ in its production.

Into a steam jacketed kettle provided with a powerful mechanical agitator, and preferably also a steam pipe with fine perforations permitting the injection of live steam into the body of the compositon, I place 100 pounds of any high grade starch, preferably potato or tapioca. To this I add 100 pounds of cold water and agitate the mixture until a smooth cream, free from lumps or clots, is formed. I then add to this mixture from 2 to 10 pounds, more or less, of chlorid of calcium (or equivalent salt as previously described) dissolved in 100 pounds of water and stir until all the ingredients are thoroughly mixed. I then heat the composition as rapidly as possible to the boiling point, and continue the cooking for an hour or more, or until the composition has become entirely smooth and clear. I then shut off the steam and agitate this thick paste, or jelly, until it has cooled, when I add, in a very thin stream and under constant stirring, caustic soda solution in sufficient quantity to partly, or wholly, decompose the chlorid of calcium and liberate the lime base contained in this salt in the form of a hydrate.

I have tried a number of alkalis, both in the form of hydrate and carbonate, with more or less satisfactory results. Ammonium hydrate in a number of cases gives excellent results, but its comparatively high cost, the losses occurring through its volatility, as well as its strong odor render its use less desirable, while the carbonates of the alkalis do not produce as satisfactory compounds as the hydrates. I therefore prefer to use caustic soda, which gives the best as well as most economical results, although if for any reason another alkali is preferred this can be substituted.

I have also found in practice that it is not necessary to entirely or completely decompose the salt used as a coagulant, but that a partial decomposition of same yields very satisfactory results.

For instance, in the practical formula just given I have found that from 4 to 6 ounces of caustic soda in concentrated solution, for every pound of calcium chlorid employed, gives a clear and perfectly homogeneous vegetable glue, although this proportion of caustic soda is insufficient to effect complete decomposition of the calcium, and may therefore be modified quite largely in order to meet special requirements.

A very marked change takes place in the paste produced by the first step (boiling the starch with calcium salt) when the alkali is added to such a composition. The paste produced by this first step, even while hot, is of a short and somewhat "livery" consistency, which breaks off in lumps or clots when lifted by a paddle or spatula, which condition increases as the paste cools. As soon as the alkali begins to act, and the double decomposition takes place the paste becomes rapidly more and more cohesive, smooth and homogeneous, with a marked reduction of viscosity and when the reaction is completed a composition of extremely cohesive, as well as adhesive, character results which flows from a paddle or spatula in long stringy masses or "curtains" entirely different from the original condition of the cooked starch paste, and indicating the completion of the coagulating action. The agitation should be continued for about a half-hour, by which time the mass in the kettle assumes the consistency of a thick solution of india rubber very elastic and stringy, and so adhesive that it readily attaches itself and clings to any surface with which it is brought in contact.

The yield for wood-working purposes should be approximately from three to four pounds of the paste for each pound of dry starch operated upon, and can be increased to any desired extent by the addition of boiling water supplemented by thorough agitation. For paper and paper-box work a paste containing from 10 to 20 pounds of dry starch per hundred pounds will be found satisfactory, the concentration depending upon the purpose for which it is to be used.

In the production of my vegetable glue I do not confine myself to any particular form or species of starch, as this depends upon the character of the product desired. I have used potato, tapioca, sago, wheat, rice and corn starches with more or less success in their raw state as found in commerce. The character of the starch base operated upon depends upon the body or viscosity desired in the finished product. The starch I generally prefer to use in carrying out my invention is tapioca, which on account of its comparatively low cost and high adhesive properties has proved the most satisfactory, but I do not of course limit myself to this particular starch as many other species can be satisfactorily substituted.

As a matter of fact it may be stated that all starches of commerce vary very greatly in their properties, even though of the same species, thus tapioca, as well as sago and corn, as found in the market show many different characteristics, some boiling up with water in a given proportion to a very thick paste, other grades very much thinner, etc., and the choice or selection of the base used must therefore be regulated according to requirements in the finished product, and especially upon the basis of relative adhesive properties.

Furthermore I do not confine myself to the use of chlorid of calcium or barium in producing my adhesive product, as I can use salts of iron, aluminum, magnesium, etc., or instead of the chlorids the sulfates or other acid combinations producing soluble salts possessing coagulating bases, with more or less satisfactory results.

The one essential element in carrying out my process is to use some salt, or combination of salts, the base of which when liberated in the manner described in this specification will coagulate or curdle starch when in solution or paste form. I have given chlorid of calcium in the practical working formula of this specification simply as an illustration and for the reason that owing to its low price, non-poisonous qualities and freedom from color, as well as the excellent results obtainable by its use, it seems a most available compound in the production of the special type of vegetable glue described.

I am aware that the treatment of dextrin or hydrolyzed starch with salts of aluminum-zinc magnesia, etc., precipitated within the body of a dextrin solution for the production of paste and mucilage is not new. In such processes the bases employed act merely as a filler or thickening agent, and do not enter into chemical combination with or coagulate the dextrin or hydrolyzed starch, as is the case when raw or unhydrolyzed starch is treated with a starch coagulating base as described in this specification.

I am further aware that the treatment of starch with caustic alkali and of carbonates of the alkali is not new, and I do not therefore broadly claim any of these processes or materials, but I claim:

1. The process herein described for the production of a vegetable glue consisting in making a smooth paste or cream by mixing starch with cold water holding in solution a salt the base of which has the property of coagulating starch, then heating this composition at, or near, the boiling point of water until the starch is converted into an undigested starch jelly, then adding to the jelly so formed a stronger base than that of the salt contained therein capable of liberating the coagulating base and effecting a smooth and uniform coagulation of the starchy material, substantially as described.

2. As a new article of manufacture, a vegetable glue consisting of water and jellified undigested starch in combination with a precipitated starch coagulating base, substantially as described.

VICTOR G. BLOEDE.

Witnesses:
WM. H. THOMAS, Jr.,
E. B. WILLIAMS.